(12) United States Patent
Mashimo et al.

(10) Patent No.: US 8,278,005 B2
(45) Date of Patent: Oct. 2, 2012

(54) SEPARATOR FOR FUEL CELL AND SOLID POLYMER TYPE FUEL CELL

(75) Inventors: Takashi Mashimo, Fujisawa (JP); Tomohiro Inoue, Fujisawa (JP)

(73) Assignee: NOK Corporation, Tokyo (JP)

( * ) Notice: Subject to any disclaimer, the term of this patent is extended or adjusted under 35 U.S.C. 154(b) by 1244 days.

(21) Appl. No.: 10/576,740

(22) PCT Filed: Oct. 22, 2004

(86) PCT No.: PCT/JP2004/015709
§ 371 (c)(1),
(2), (4) Date: Feb. 1, 2007

(87) PCT Pub. No.: WO2005/038970
PCT Pub. Date: Apr. 28, 2005

(65) Prior Publication Data
US 2007/0196716 A1 Aug. 23, 2007

(30) Foreign Application Priority Data
Oct. 22, 2003 (JP) .................... 2003-362340

(51) Int. Cl.
*H01M 2/08* (2006.01)
*H01M 2/14* (2006.01)
*H01M 8/10* (2006.01)
(52) U.S. Cl. ......... 429/508; 429/512; 429/482; 429/492
(58) Field of Classification Search .............. 429/12, 429/34, 35, 482, 492, 508, 512
See application file for complete search history.

(56) References Cited

U.S. PATENT DOCUMENTS

| 6,610,435 B1 | 8/2003 | Maruyama et al. | |
|---|---|---|---|
| 2003/0104262 A1* | 6/2003 | Kuroki et al. | 429/36 |
| 2007/0207365 A1* | 9/2007 | Ohnuma | 429/38 |

FOREIGN PATENT DOCUMENTS

| JP | 10-074530 | 3/1998 |
|---|---|---|
| JP | 2000-133289 | 5/2000 |
| JP | 2001-319666 | 11/2001 |
| JP | 2002-015751 | 1/2002 |
| JP | 2002-050364 | 2/2002 |
| JP | 2003-197221 | 7/2003 |
| JP | 2003-197249 | 7/2003 |
| JP | 2004-185811 | 7/2004 |

OTHER PUBLICATIONS

Translation of JP 2002050364 (submitted by applicants).*
European Search Report dated Aug. 26, 2008.

* cited by examiner

*Primary Examiner* — Barbara Gilliam
*Assistant Examiner* — Edu E Enin-Okut
(74) *Attorney, Agent, or Firm* — Jacobson Holman PLLC

(57) ABSTRACT

Notches 23e are filled with part of an elastic material that is injection-molded in a region containing the notches 23e, so that a plate member 23b is taken in by the notches 23e through the repulsive force of the elastic material. Thus, the plate member 23b is secured. Further, the elastic material filling the notches 23e enlarges the joined portion between the plate member 23b and the gasket 24b. Accordingly, the gasket 24b is firmly joined to the surface of the plate member 23b, and can be prevented from being lifted up from the plate member 23b. Thus, the plate member 23b is firmly secured to the separator main body 25.

2 Claims, 10 Drawing Sheets

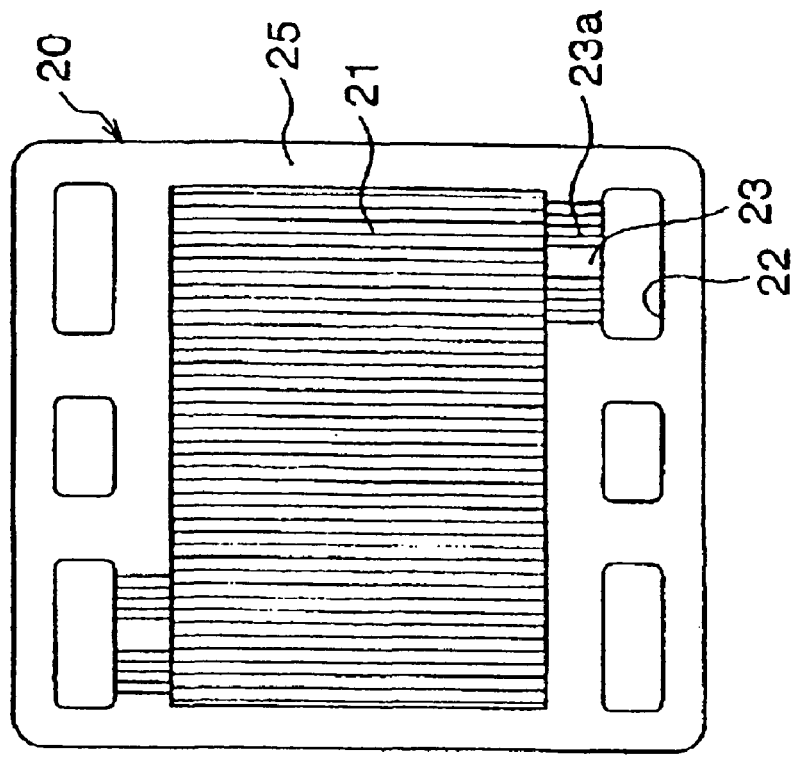
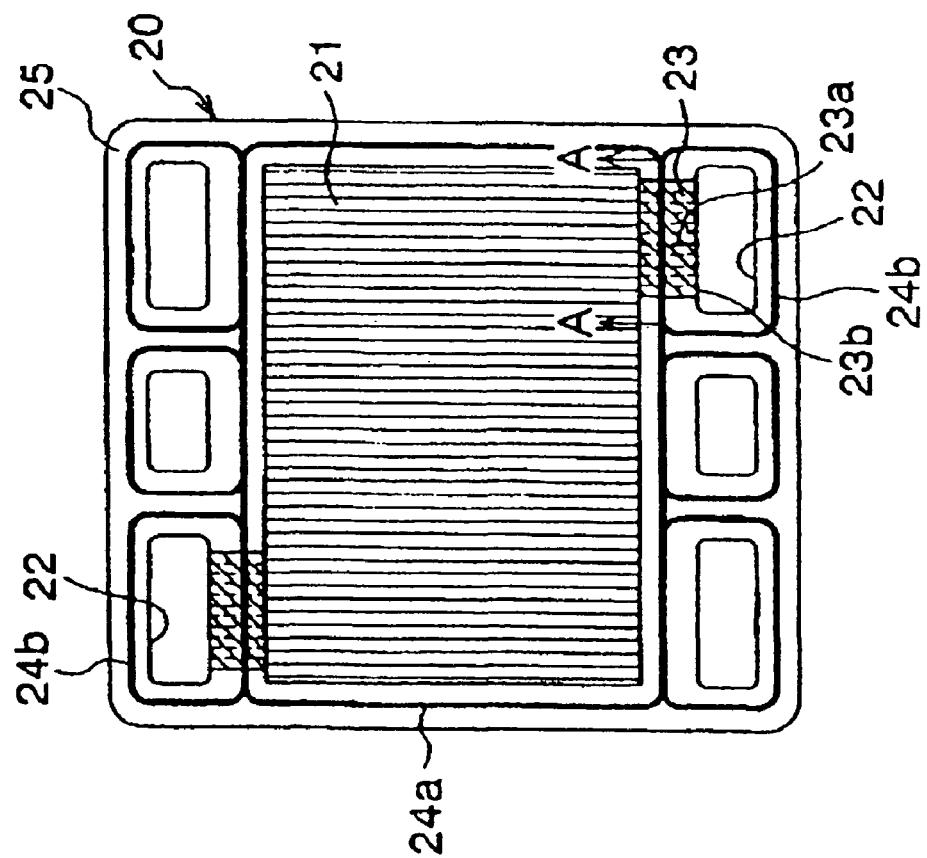
FIG.1A
FIG.1B

SEPARATOR FOR FUEL CELL AND SOLID POLYMER TYPE FUEL CELL

This is a nationalization of PCT/JP2004/015709 filed 22 Oct. 2004 and published in Japanese.

TECHNICAL FIELD

The present invention relates to a fuel cell separator and a solid polymer electrolyte fuel cell that employs the fuel cell separator.

BACKGROUND ART

In general, a fuel cell is formed with a power generating device that has an electrolyte film and electrode films (a fuel electrode and an air electrode) placed on both side of the electrolyte film, and separators that have fluid passages for supplying fuel gas (hydrogen) and oxide gas (oxygen, normally the atmosphere) to the electrode films. A solid polymer electrolyte fuel cell has a fuel cell stack that is formed by stacking fuel cells of the above-described type.

FIG. 11 is a cross-sectional view of a conventional fuel cell 100 that has a power generating device 300 interposed between a separator 200A and a separator 200B. Since the volt age is too low in the single cell 100, several cells of this type are stacked to form a fuel cell stack.

The power generating device 300 includes a fuel electrode 300A that is located to face the separator 200A for fuel gas supply, an air electrode 300B that is located to face the separator 200B for oxide gas supply, and an electrolyte film 300C that is interposed between the fuel electrode 300A and the air electrode 300B.

FIG. 12 is a plan view of a conventional separator 200.

The separator 200 has a gas channel 201 having a number of concave grooves formed in the center of the surface of a separator main body 205. Also, manifolds 202 that penetrate the separator main body 205 in the stacking direction are provided on both sides of the gas channel on the surface of the separator main body 205. Gas is supplied to the gas channel 201 via the manifolds 202.

Connecting paths 203 that connect the concave grooves of the gas channel 201 to the manifolds 202 are formed between the gas channel 201 and the manifolds 202.

Each of the connecting paths 203 is formed in a tunnel-like fashion with grooves 203a that connects the gas channel 201 to the manifolds 202, and a plate member 203b that covers the openings of the grooves 203a.

A gasket 204a that is made of an elastic material, surrounds the gas channel 201, and prevents gas leakage from the gas channel 201 to the outside, is formed on the surface of the separator main body 205.

Also, a gasket 204b that is made of an elastic material is formed at the peripheral portion of the manifolds 202, including the surface of the plate member 203b that covers the grooves 203a. Accordingly, the gas to be supplied from the manifolds 202 to the connecting paths 203 is prevented from leaking to another separator 200 stacked on the separator 200 or to the power generating device 300 interposed between the separators.

As the plate member 203b covers the grooves 203a and the gasket 204b is provided on the surface of the plate member 203b, the plate member 203b is pushed onto the grooves 203a by virtue of the repulsive force of the gasket 204b against the compression force applied from the other separator 200 stacked on the upper surface of the gasket. Thus, the connecting paths can be hermetically sealed.

If an adhesive agent is used to secure the plate member 203b to a predetermined position on the upper surface of the grooves 203a of the separator 200, the adhesive agent might stick out to the grooves 203a, and defective bonding is caused, resulting in a deterioration in quality. Therefore, the plate member 203b is engaged with the upper surface of the grooves 203a without an adhesive agent, and the gaskets 204a and 204b made of an elastic material are integrally molded in a series at the entire peripheral portion of the manifolds 202, including the surface of the plate member 203b. In this manner, the plate member 203b is secured to a predetermined position on the upper surface of the grooves of the separator 200. A fuel cell separator with this structure has been known (refer to Patent Document 1).

[Patent Document 1] Japanese Unexamined Patent Publication No. 2002-50364

DISCLOSURE OF THE INVENTION

Problems to be Solved by the Invention

In the above conventional separator, however, the fixing of the plate member 203b to the separator main body 204 is performed only with the gasket 204b molded on the surfaces of the separator 200 and the plate member 203b. Thus, for example, if the gasket 204 is thin, the plate member 203b might move away from the predetermined fixing position, or the plate member 203b might fall off while a fuel cell or a fuel cell stack is being assembled. Because of this, the plate member 203b is not firmly secured.

Furthermore, when the once-stacked separators 200 are disassembled, the gasket 204b formed on the surface of the plate member 203b sticks to the mating separator. As a result, there is a problem that the plate member 203b is lifted up, and the gasket 204b breaks at the corresponding parts.

Therefore, the object of the present invention is to provide fuel cell separators and a solid polymer electrolyte fuel cell in which the above problems of the related art are solved, the plate member can be firmly secured to the separator main body, and the gasket does not break when separators are disassembled.

Means to Solve the Problems

To achieve above-described object, the present invention provides a fuel cell separator that has a power generating device interposed between the fuel cell separator and another fuel cell separator, the power generating device having an electrolyte film and electrode films, the fuel cell separator comprising:

a separator main body that includes a gas channel, a manifold that penetrates the separator main body in a fuel cell stacking direction, and a groove that connects the gas channel to the manifold;

a plate member that covers an opening of the groove; and a gasket that is made of an elastic material, prevents gas leakage from the manifold to the outside, and is formed in a region on the surfaces of the separator main body and the plate member, the region surrounding the manifold, wherein the plate member has notches or through holes, when the gasket is being integrally molded with the region on the surface of the plate member containing the notches or the through holes, part of the elastic material fills the notches or the through holes, thereby increasing the fixing strength of the plate member to a predetermined position on the opening of the groove.

To achieve above-described object, the present invention provides a fuel cell separator that has a power generating device interposed between the fuel cell separator and another fuel cell separator, the power generating device having an electrolyte film and electrode films, the fuel cell separator comprising:

a separator main body that includes a gas channel, a manifold that penetrates the separator main body in a fuel cell stacking direction, and a groove that connects the gas channel to the manifold;

a plate member that covers an opening of the groove; and a gasket that is made of an elastic material, prevents gas leakage from the manifold to the outside, and is formed in a region on the separator main body and the surface of the plate member, the region surrounding the manifold, wherein the plate member has notches or through holes, the separator main body has guide protrusions that protrude from the separator main body, the guide protrusions have top ends inserted to the notches or the through holes formed in the plate member, when the gasket is being integrally molded with the region on the surface of the plate member containing the notches or the through holes, part of the elastic material fills gaps between the guide protrusions and the notches or the through holes, thereby increasing the fixing strength of the plate member to a predetermined position on the opening of the groove.

According to the preferred aspect of the present invention, there is provided a fuel cell separator, wherein:

the separator main body has concave portions at the locations corresponding to the notches or the through holes formed in the plate member; and when the gasket is being integrally molded with the region on the surface of the plate member containing the notches or the through holes, part of the elastic material also fills the concave portions, thereby increasing the fixing strength of the plate member to the predetermined position on the opening of the groove.

To achieve above-described object, the present invention provides a fuel cell separator that has a power generating device interposed between the fuel cell separator and another fuel cell separator, the power generating device having an electrolyte film and electrode films, the fuel cell separator comprising:

a separator main body that includes a gas channel, a manifold that penetrates the separator main body in a fuel cell stacking direction, and a groove that connects the gas channel to the manifold;

a plate member that covers an opening of the groove; and a gasket that is made of an elastic material, prevents gas leakage from the manifold to the outside, and is formed in a region on the surfaces of the separator main body and the plate member, the region surrounding. the manifold, wherein the plate member has notches or through holes, the separator main body has concave portions at the locations corresponding to the notches or the through holes formed in the plate member, part of the elastic material that forms the gasket formed on the surface of the plate member, protrudes from the back surface of the plate member through the notches or the through holes, thereby forming convex portions, the convex portions are engaged with the concave portions formed in the separator main body, thereby securing the plate member to a predetermined position on the opening of the groove in the separator main body.

According to the preferred aspect of the present invention, there is provided a fuel cell separator, wherein the gasket that is formed on the surface of the separator main body is formed separately from the gasket formed on the surface of the plate member.

To achieve above-described object, there is provided a solid polymer electrolyte fuel cell comprising the fuel cell separator.

Effects of the Invention

As described above, with the fuel cell separators and the solid polymer electrolyte fuel cell of the present invention, the plate member can be firmly secured to the separator main body. Also, the present invention provides fuel cell separators and the solid polymer electrolyte fuel cell in which the gaskets do not break when the separators are disassembled.

BEST MODE FOR CARRYING OUT THE INVENTION

The following is a detailed description of preferred embodiments of the present invention, with reference to the accompanying drawings. However, the sizes, materials, shapes, and relative locations of the components described in the following embodiments do not limit the scope of the present invention, unless otherwise specified.

(First Embodiment)

FIGS. 1A and 1B are plan views of a fuel cell separator (hereinafter referred to as a "separator") in accordance with a first embodiment of the present invention.

FIG. 1A illustrates a separator 20 that has a plate member 23b provided on grooves 23a, and gaskets 24a and 24b formed on the surfaces of a separator main body 25 and the plate member 23b. As shown in FIG. 1A, the separator 20 has a gas channel 21 with a number of concave grooves. The gas channel 21 is provided in the center of the surface of the plate-like separator main body 25. Also, manifolds 22 that penetrate the separator main body 25 in the stacking direction are formed at both ends of the gas channel 21 on the separator main body 25. As separators 20 are stacked on one another, the manifolds 22 formed in each separator main body 25 forms a channel that penetrates the fuel cell. As a result, a manifold is formed in the fuel cell stack. In this embodiment, the manifolds 22 are formed at six locations, with the gas channel 21 being flanked by the manifolds 22. However, gas is supplied to and discharged from the gas channel 21 through the two manifolds 22 that are located on a diagonal line of the gas channel 21. Through the other manifolds, gas is supplied to other separators that form other fuel cells and are stacked on the separator 20.

Connecting paths 23 that connect the concave grooves that form the gas channel 21 to the manifolds 22 is formed between the gas channel 21 and the manifolds 22.

Each of the connecting paths 23 is formed in a tunnel-like fashion with the corresponding groove 23a, which connects the gas channel 21 and the corresponding manifold 22, and the plate member 23b, which covers the opening of the grooves 23a.

FIG. 1B illustrates the above separator, with the plate members 23b being removed from the grooves 23a to open the connecting paths 23.

FIG. 2 is a cross-sectional view of the separator, taken along the line A-A of FIG. 1A.

As shown in FIG. 2, the separator main body 25 has not only the grooves 23a that form the gas channel, but also a housing concave portion 23c that houses the plate member 23b so that the surface of the plate member 23b forms the same plane as the surface of the separator main body 25. Accordingly, the grooves 23a are formed through the bottom surface of the housing concave portion 23c. The plate member 23b is engaged with the housing concave portion 23c without an adhesive agent.

The separator 20 may preferably be formed with a metal plate such as SUS (steel use stainless), an aluminum plate and a titanium plate, a composite resin material such as FRP (fiber reinforced plastics) and CFRP (carbon fiber reinforced plastics), calcined carbon, a heat-resistant resin material such as PET (polyethylene terephthalate), PEN (polyethernitrile), PI (polyimide), PAI (polyamidimide), PPS (polyphenylene sulfide), PEEK (polyether ether ketone), or a conductive resin material.

The material for the plate member 23b is not particularly limited, as long as it tolerates integral molding with the gaskets. The plate member 23b may preferably be formed with the same material for the separator 20, and a heat-resistant resin material such as PEEK or PI.

The gaskets 24a that surround the gas channel 21 to prevent gas leakage from the gas channel 21 to the outside, and are made of an elastic material are formed on the surface of the separator main body 25.

The material for the gaskets 24a is not particularly limited, as long as each gasket 24a is made of an elastic material that is commonly used. For example, elastic materials such as fluorocarbon rubber, EPDM, or silicone rubber are preferable.

Each gasket 24a can be molded beforehand, and be bonded to a predetermined location on the separator main body 25. In such a case, however, an adhesive agent is used. In view of this, an elastic material should preferably be injection-molded at the predetermined location on the separator main body 25, so that the gasket 24a is integrally molded on the surface of the separator main body 25.

Also, each gasket 24b is provided on the surface of the plate member 23b and the surface of the separator main body 25, which surround the openings of the manifolds 22. In the separator of this embodiment, the gaskets 24a and the gaskets 24b are integrally molded at the same time through injection molding of elastic materials.

FIGS. 3A through 3D are partially enlarged views illustrating the vicinity of one of the manifolds 22 of the separator main body 25, including the plate member 23b and the gasket 24b formed on the surface of the plate member 23b. FIG. 3A illustrates the state after the gasket molding. FIG. 3B illustrates the state prior to the gasket molding.

The separator in accordance with the first embodiment has notches 23e that are formed at the longitudinal-direction ends and the width-direction center of the plate member 23b, and extend in the stacking direction, as shown in FIG. 3B.

FIG. 3C illustrates a state, with the plate member 23b being removed. In the separator main body 25, the housing concave portion 23c for housing the plate member 23b is formed, and the grooves 23a are formed through the bottom surface of the housing concave portion 23c.

As shown in FIG. 3A, with the plate member 23b being engaged with the housing concave portion 23c, an elastic material is injection-molded to integrally mold the gasket 25b in the region containing the separator main body 25 and the notches 23e of the surface of the plate member 23b, so that the gasket 25b surrounds the manifold 22. In this manner, part of the elastic material flows into the spaces between the plate member 23b and the separator main body 25, thereby securing the plate member 23b to the predetermined location on the separator main body 25.

FIG. 3D is a cross-sectional view of the structure, taken along the line A-A of FIG. 3A.

As shown in FIG. 3D, the notches 23e are filled with part of the elastic material injection-molded in the region containing the notches 23e, and the plate member 23b is taken in with the notches 23e by virtue of the repulsive force of the elastic material. Thus, the plate member 23b is secured. Further, with the elastic material filling the notches 23e, the joined portion between the plate member 23b and the gasket 24b is enlarged. Accordingly, the gasket 24b is firmly fixed to the surface of the plate member 23b, and can be prevented from being lifted up from the plate member 23b. Thus, the plate member 23b is firmly fixed to the separator main body 25.

In the separator in accordance with the first embodiment, the notices 23e may be replaced with through holes. In such a case, the joined portion between the plate member 23b and the gasket 24b is enlarged by the elastic material filling the through holes. Accordingly, the gasket 24b is firmly fixed to the surface of the plate member 23b, and can be prevented from being lifted up from the plate member 23b.

(Second Embodiment)

FIGS. 4A through 5D illustrate separators in accordance with a second embodiment of the present invention.

FIGS. 4A through 5D are partially enlarged views illustrating the vicinity of one of the manifolds 22 of the separator main body 25, including the plate member 23b and the gasket 24b formed on the surface of the plate member 23b. FIGS. 4A and 5A illustrate the states after the gasket molding. FIGS. 4B and 5B illustrate the states prior to the gasket molding. FIGS. 4C and 5C illustrate the states, with the plate member 23b being removed.

The separator in accordance with the second embodiment has the notches 23e formed in the plate member 23b, as shown in FIG. 4B. Also, the housing concave portion 23c for housing the plate member 23b has guide protrusions 23f that protrude therefrom. The top ends of the guide protrusions 23f are inserted to the notches 23e.

The guide protrusions 23f are formed at the locations corresponding to the notches 23e of the housing concave portion 23c, so as to sandwich the notches 23e formed at both ends of the plate member 23b.

Accordingly, the plate member 23b can be easily positioned onto the separator main body 25.

FIG. 4D is a cross-sectional view of the structure, taken along the line B-B of FIG. 4A.

As shown in FIG. 4D, the notches 23e outside the guide protrusions 23f are filled with part of the elastic material that is injection-molded in the region containing the notches 23e. Thus, the plate member 23b is secured.

FIGS. 5A through 5D illustrate a modification of the separator in accordance with the second embodiment.

As shown in FIG. 5B, through holes 23g are formed in the plate member 23b. Also, the guide protrusions 23f are formed to protrude from the housing concave portion 23c that is formed on the separator main body and houses the plate member 23b. The top ends of the guide protrusions 23f are inserted to the through holes 23g.

The guide protrusions 23f are inserted to the through holes 23g formed at both ends of the plate member 23b, with small gaps being left.

FIG. 5D is a cross-sectional view of the structure, taken along the line C-C of FIG. 5A.

As shown in FIG. 5D, the gap between the outer peripheral surface of each guide protrusion 23f and the inner peripheral surface of each through hole 23g is filled with part of the elastic material that is injection-molded in the region containing the through holes 23g. Thus, the plate member 23b is secured.

The other aspects of the structure are the same as those of the separator in accordance with the first embodiment, and therefore, explanation of them is not repeated here.

(Third Embodiment)

FIGS. 6A through 6D illustrate a separator in accordance with a third embodiment of the present invention.

FIGS. 6A through 6D are partially enlarged views illustrating the vicinity of one of the manifolds 22 of the separator main body 25, including the plate member 23b and the gasket 24b formed on the surface of the plate member 23b. FIG. 6A illustrates the state after the gasket molding. FIG. 6B illustrates the state prior to the gasket molding. FIG. 6C illustrates the state, with the plate member 23b being removed.

The separator in accordance with the third embodiment has the through holes 23g formed in the plate member 23b, as shown in FIG. 6B.

Also, the housing concave portion 23c that is formed in the separator main body 25 and houses the plate member 23b has concave portions 23h formed at the locations corresponding to the through holes 23g, as shown in FIGS. 6C and 6D. In this embodiment, each of the concave portions 23h is a circular hole that is concentric with each corresponding through hole 23g and has a bottom with a greater diameter than the diameter of each corresponding through hole 23g.

FIG. 6D is a cross-sectional view of the structure, taken along the-line D-D of FIG. 6A.

As shown in FIG. 6D, an elastic material is injection-molded in the region that surrounds the manifold 22 and contains the through holes 23g formed through the surfaces of the separator main body 25 and the plate member 23b, and the through holes 23g and the concave portions 23h are filled with the elastic material. Thus, the gasket 24b is secured to the separator main body 25.

As shown in FIG. 6D, since each of the concave portions 23h has a greater diameter than the diameter of each through hole 23g, the elastic material filling the concave portions 23h more firmly secures the gasket 24b onto the surface of the plate member 23b. Accordingly, the bonding force between the plate member 23b and the gasket 24b is increased. Thus, the gasket 24b can be prevented from being lifted up from the plate member 23b.

In the separator in accordance with the third embodiment, the through holes 23g may be replaced with the same notches as the notches 23e of the first embodiment. In such a case, the housing concave portion 23c that houses the plate member 23b has the concave portions 23h formed at the locations corresponding to the notches, so that the same effects as above can be achieved.

The other aspects of this structure are the same as those of the separator in accordance with the first embodiment, and therefore, explanation of them is not repeated here.

(Fourth Embodiment)

FIG. 7 is a plan view of a separator in accordance with a fourth embodiment of the present invention.

Like any of the foregoing embodiments, the separator in accordance with the fourth embodiment has the gasket 24a in the region on the surface of the separator main body 25 that surround the gas channel 21. Further, a gasket that surrounds each corresponding manifold 22 is formed with the gasket 24b that is formed at the outer peripheral portions of the opening of the manifold 22 and is located outside the surface of the plate member 23b, and a gasket 24c that is formed separately from the gasket 24b and is located on the surface of the plate member 23b.

In the separator in accordance with the fourth embodiment, the gasket 24a and the gasket 24b outside the surface of the plate member 23b are integrally molded at the same time on the surface of the separator main body 25 through injection molding.

Further, the gasket 24c is separately formed on the surface of the plate member 23b. In this case, a gap is formed between the gasket 24b and the gasket 24c. However, the gap is located in the position corresponding to the region other than the concave grooves of the gas channel 21, so that gas leakage can be prevented.

Since the gasket 24c is formed separately from the gasket 24b, part of the elastic material enters the gap formed between the separator main body 25 and the plate member 23b at the time of the integral molding of the gasket, thereby preventing burrs. Accordingly, the entered elastic material prevents the plate member 23b from lifting. Thus, gas leakage can be avoided.

FIG. 8 is a cross-sectional view of the structure, taken along the line E-E of FIG. 7. FIG. 9A is a plan view of the plate member 23b in accordance with this embodiment. FIG. 9B is a plan view illustrating the state in which the gasket 24c is formed on the surface of the plate member 23b.

As shown in FIGS. 8 and 9A, in this embodiment, a through hole 23i that penetrates the plate member 23b in the stacking direction is formed at the center of the surface of the plate member 23b. As shown in FIG. 9B, the gasket 24c is then formed in the region on the surface of the plate member 23b including the through hole 23i.

Further, a convex portion 24d that protrudes from the through hole 23i is integrally formed with the gasket 24c on the back surface of the plate member 23b.

The gasket 24c formed on the surface of the plate member 23b may be bonded to a predetermined position on the plate member 23b after the convex portion 24d is molded on the back surface of the gasket 24c. In such a case, however, an adhesive agent is required. Therefore, it is preferable to set the plate member 23b in a mold, injection-mold the elastic material in the region containing the through hole 23i, and then integrally mold the gasket 24c and the convex portion 24d.

In the housing concave portion 23c that is formed in the separator main body 25 and houses the plate member 23b, a concave portion 23j is provided at the location corresponding to the through hole 23i formed in the plate member 23b.

The plate member 23b is then engaged with the housing concave portion 23c, so that the convex portion 24d protruding from the back surface of the plate member 23b is engaged with the concave portion 23j. Thus, the plate member 23b can be certainly fixed to a predetermined location on the separator main body 25.

In this manner, at the time of assembling a fuel cell or a fuel cell stack, the fixed position of the plate member 23b can be prevented from moving, and the plate member 23b can be prevented from falling off.

Further, when a once-stacked separator is disassembled, the gasket 24c formed on the surface of the plate member 23b can be prevented from sticking to the mating separator, and the plate member 23c can be prevented from being lifted up. Thus, the gasket 24c can be prevented from breaking.

FIG. 10 is a modification of the separator in accordance with the fourth embodiment.

As shown in FIG. 10, two through holes 23i are formed in the vicinities of both ends of the plate member 23b in the longitudinal direction. The convex portion 24d protruding from each of the through holes 23i is integrally formed with the gasket 24c.

In this modification, the plate member 23b is fixed to a predetermined position on the separator main body 25 by virtue of the two convex portions 24d protruding from the vicinities of the end portions of the plate member 23b in the longitudinal direction. Accordingly, more accurate fixing of the plate member 23b can be performed, and the plate member 23b can be prevented from moving or falling off at the time of stack assembling.

The other aspects of this structure are the same as those of the separator of the first embodiment, and therefore, explanation of them is not repeated here.

A power generating device that has an electrolyte film and electrode films (a fuel electrode and an air electrode) placed on both sides of the electrolyte film may be interposed between separators 20 of any of the above embodiments, thereby forming a fuel cell. Such fuel cells are stacked on one another to form a fuel cell stack.

In such a fuel cell stack, the plate member 23b can be prevented from moving away from the predetermined attachment position or falling off at the time of assembling of the stack. Also, while the stack is being disassembled, the plate member 23b can be prevented from being lifted up from the attachment position on each separator main body 25 and thus the gaskets can be prevented from breaking.

BRIEF DESCRIPTION OF THE DRAWINGS

FIGS. 1A and 1B are plan views of a separator in accordance with a first embodiment;

DESCRIPTION OF REFERENCE NUMERALS

Figure 2:
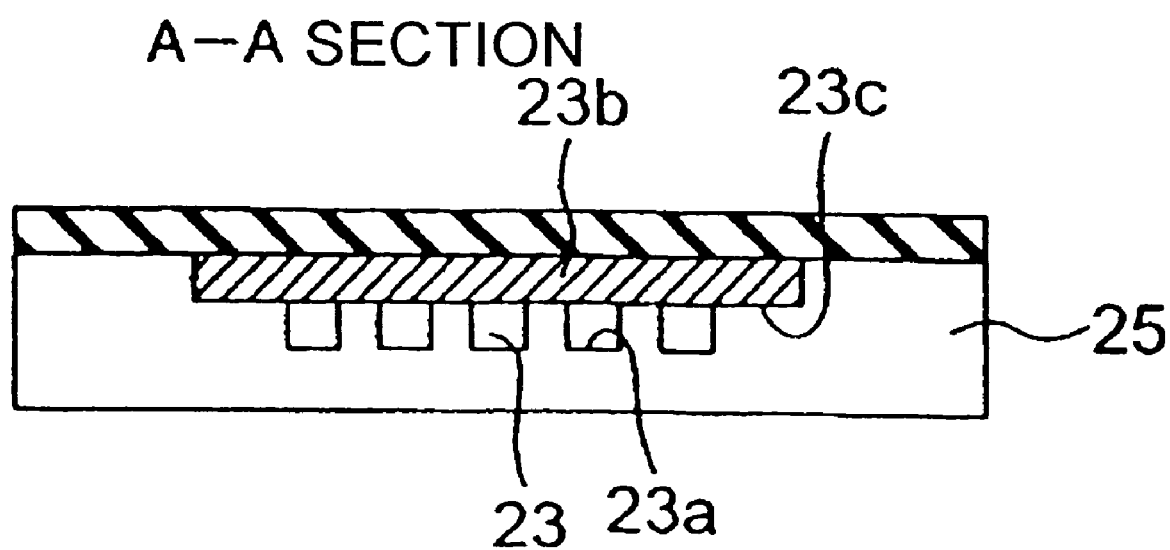
FIG. 2 is a cross-sectional view of the separator, taken along the line A-A of FIG. 1A.
Figure 3A:
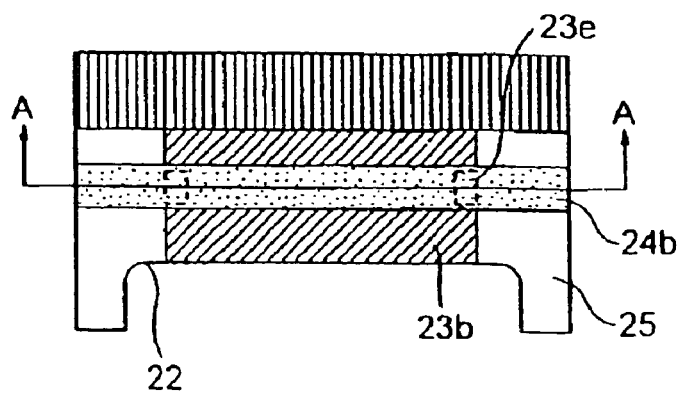
FIGS. 3A through 3D are partially enlarged views of the separator in accordance with the first embodiment.
Figure 3B:
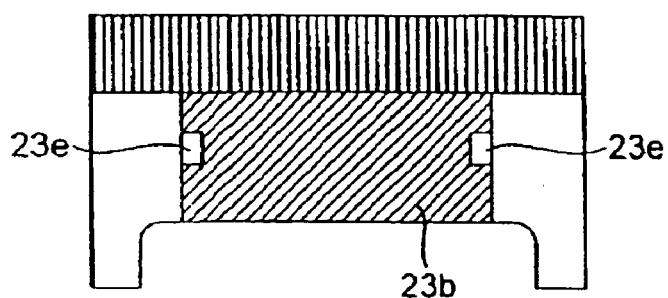
Figure 3C:
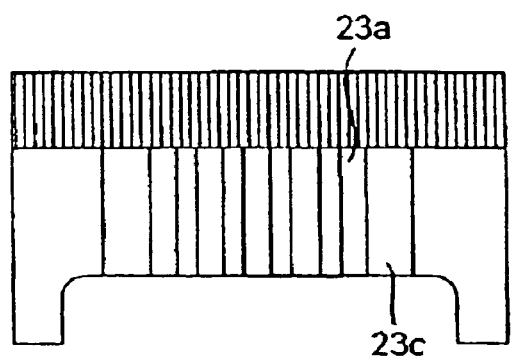
Figure 3D:
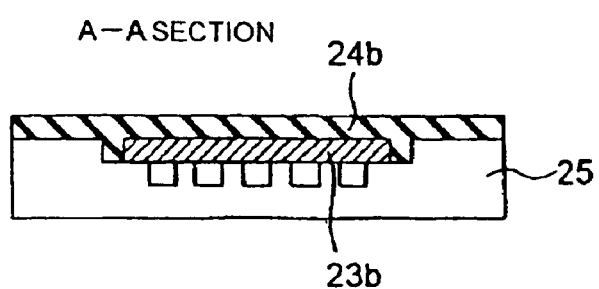
Figure 4A:
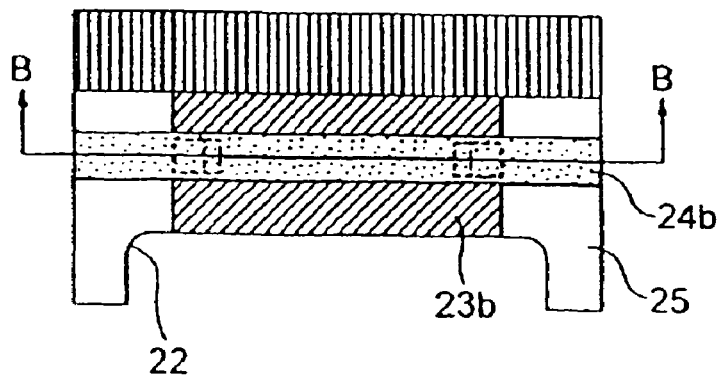
FIGS. 4A through 4D are partially enlarged views of a separator in accordance with a second embodiment.
Figure 4B:
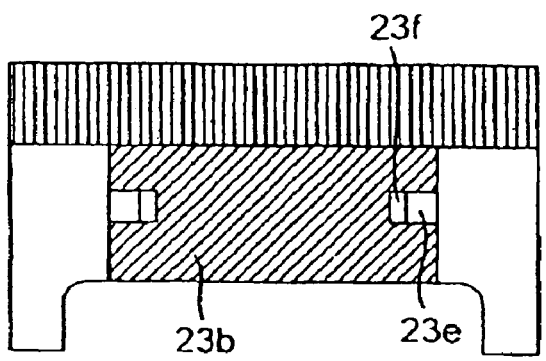
Figure 4C:
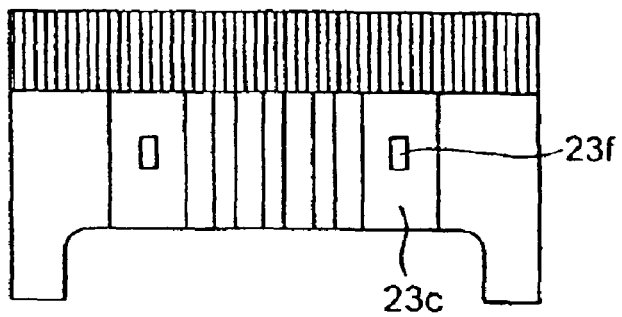
Figure 4D:
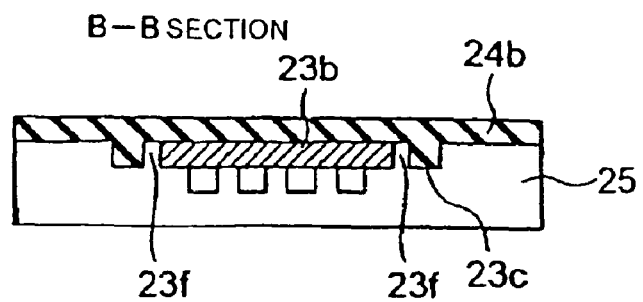
Figure 5A:
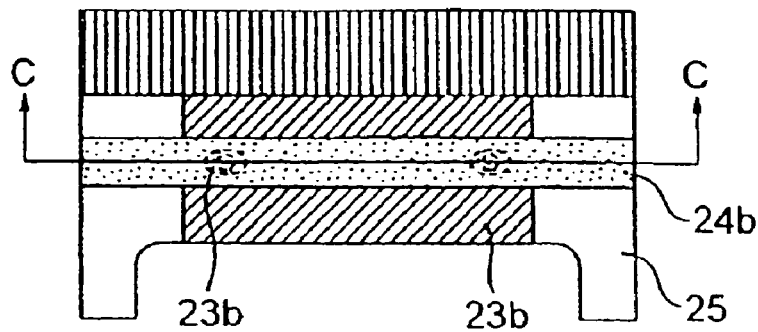
FIGS. 5A through 5D are partially enlarged views of a modification of the separator in accordance with the second embodiment.
Figure 5B:
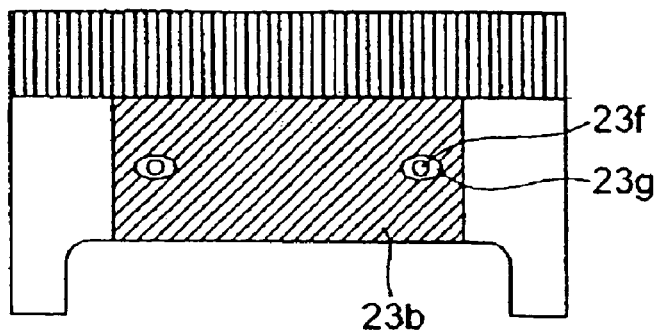
Figure 5C:
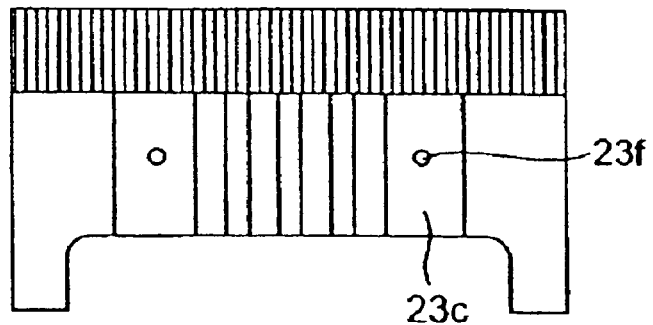
Figure 5D:
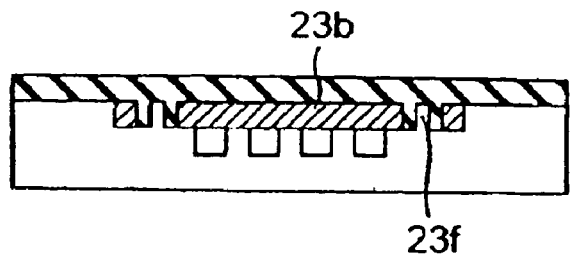
Figure 6A:
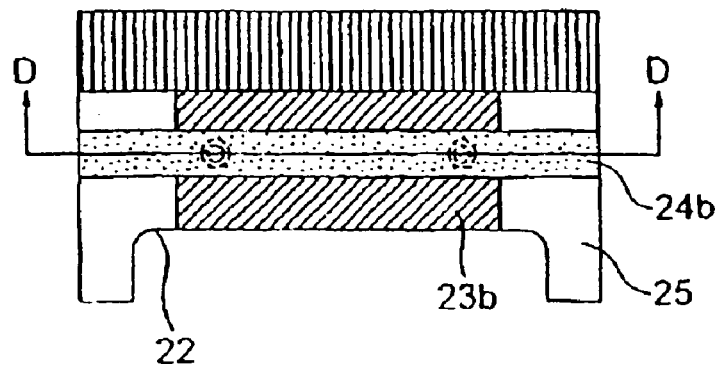
FIGS. 6A through 6D are partially enlarged views of a separator in accordance with a third embodiment.
Figure 6B:
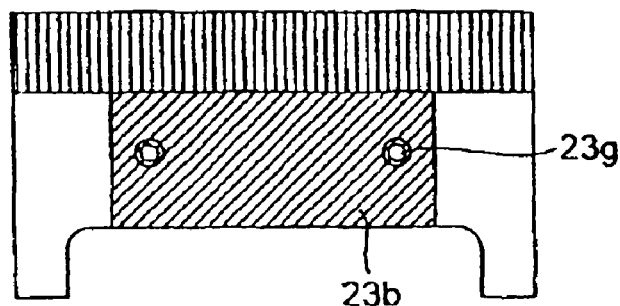
Figure 6C:
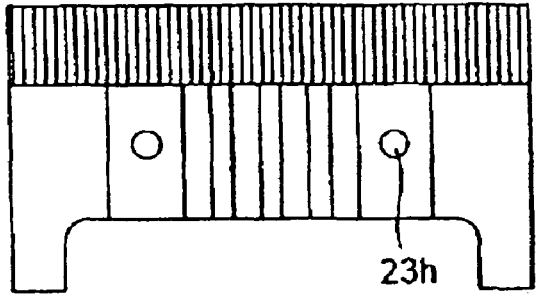
Figure 6D:
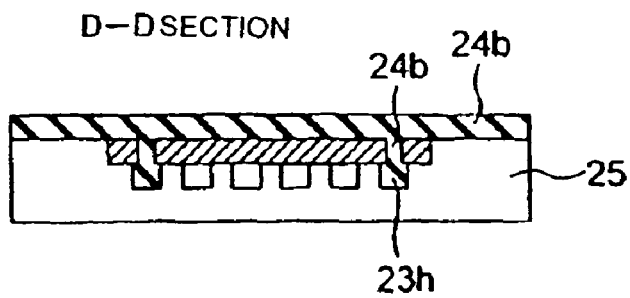
Figure 7:
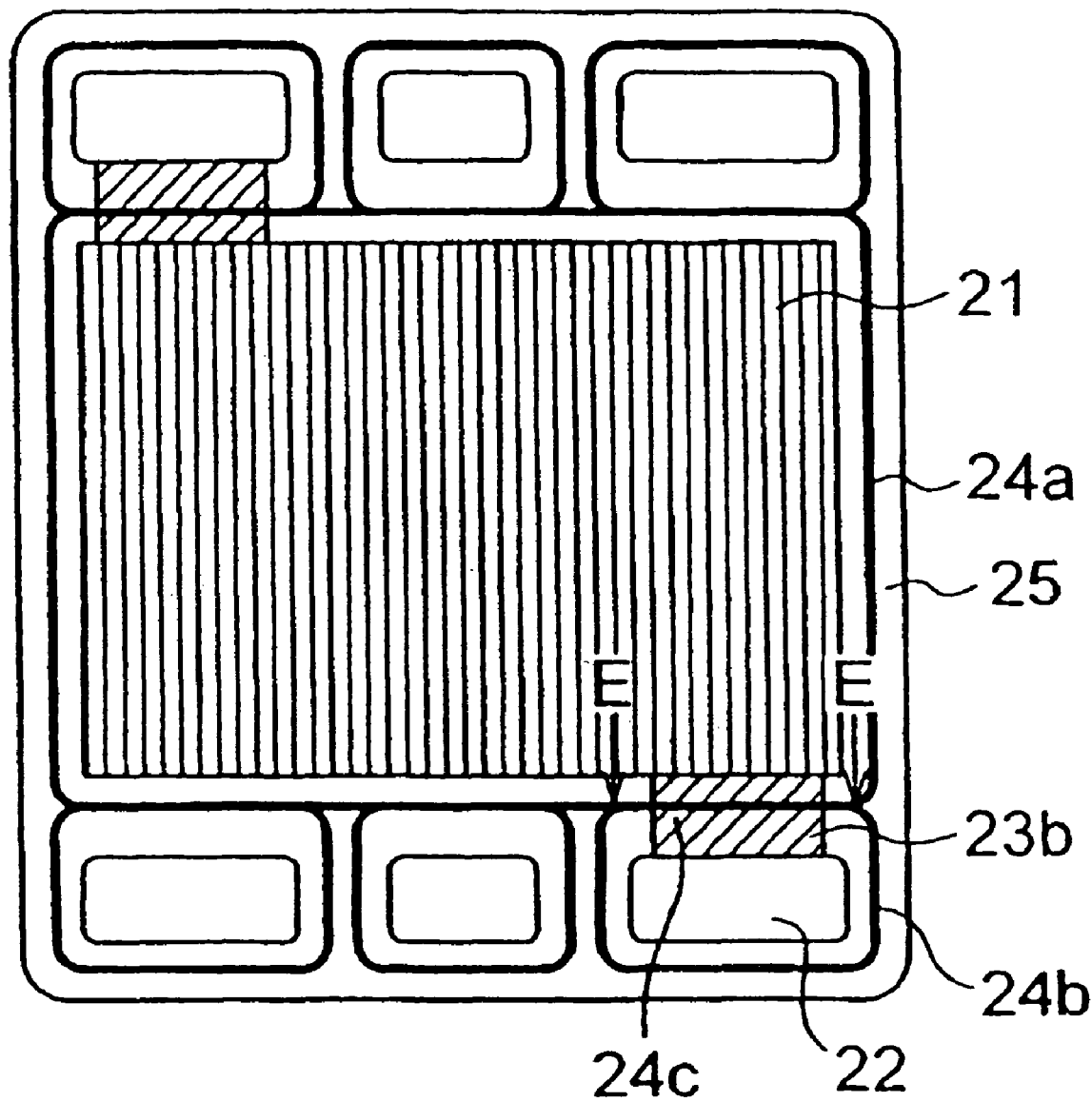
FIG. 7 is a plan view of a separator in accordance with a fourth embodiment.
Figure 8:
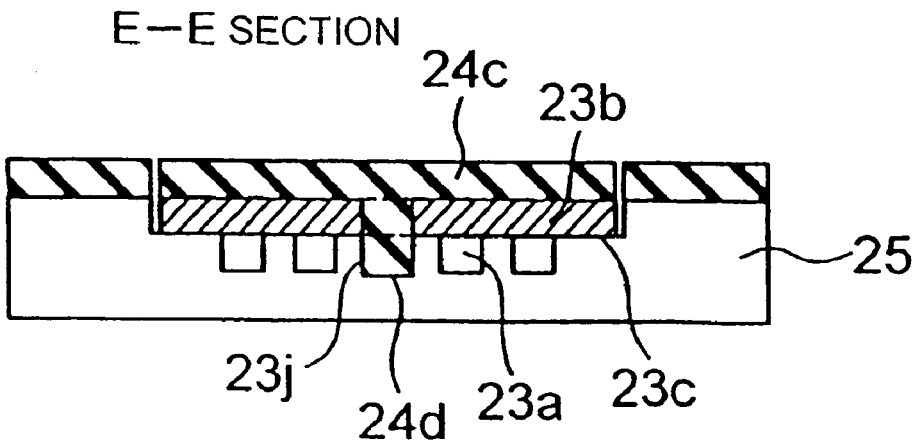
FIG. 8 is a partially enlarged view of the separator in accordance with the fourth embodiment.
Figure 9A:
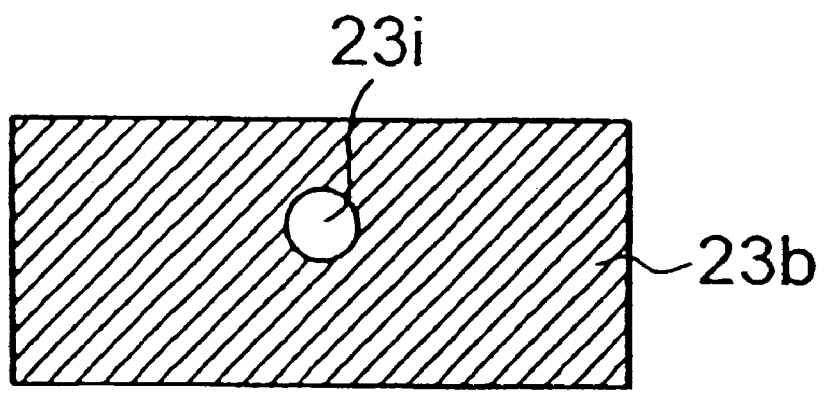
FIGS. 9A and 9B are plan views of the plate member of the separator in accordance with the fourth embodiment.
Figure 9B:
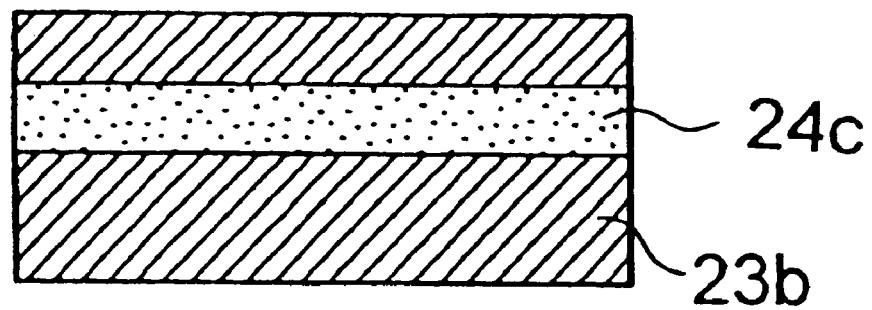
Figure 10:
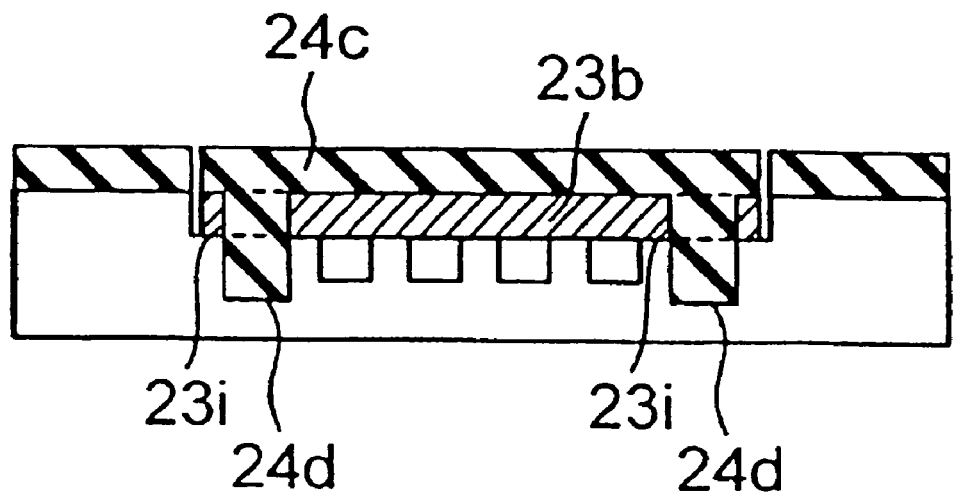
FIG. 10 is a partially enlarged view of a modification of the separator in accordance with the fourth embodiment.
Figure 11:
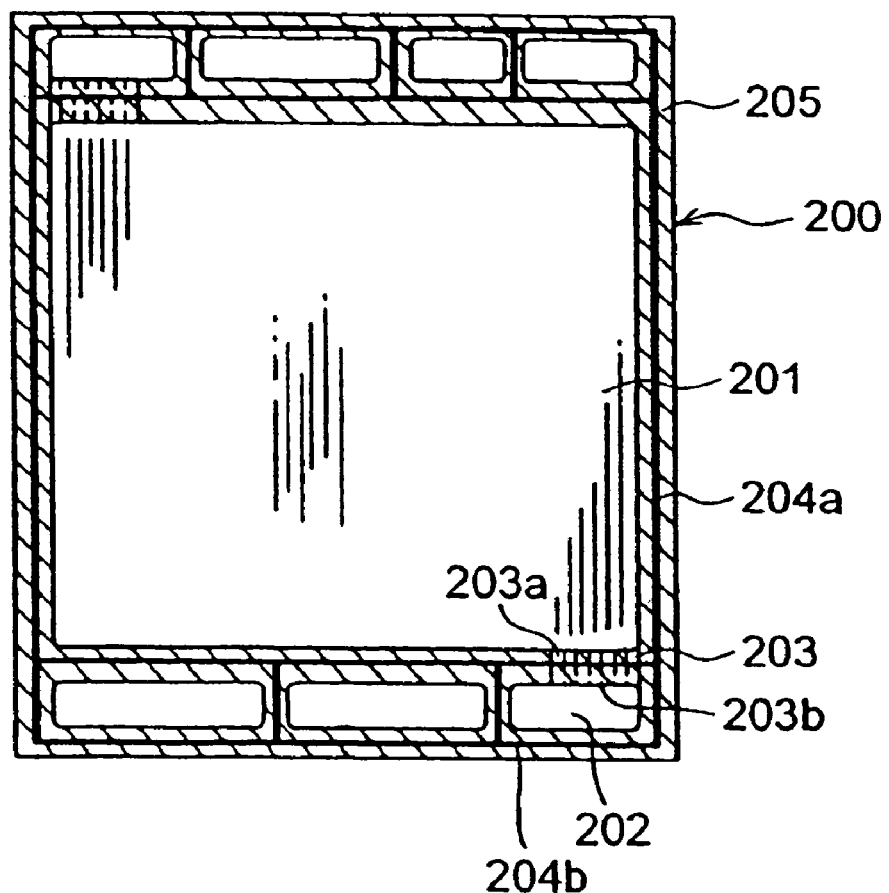
FIG. 11 is a cross-sectional view of a conventional fuel cell.
Figure 12:
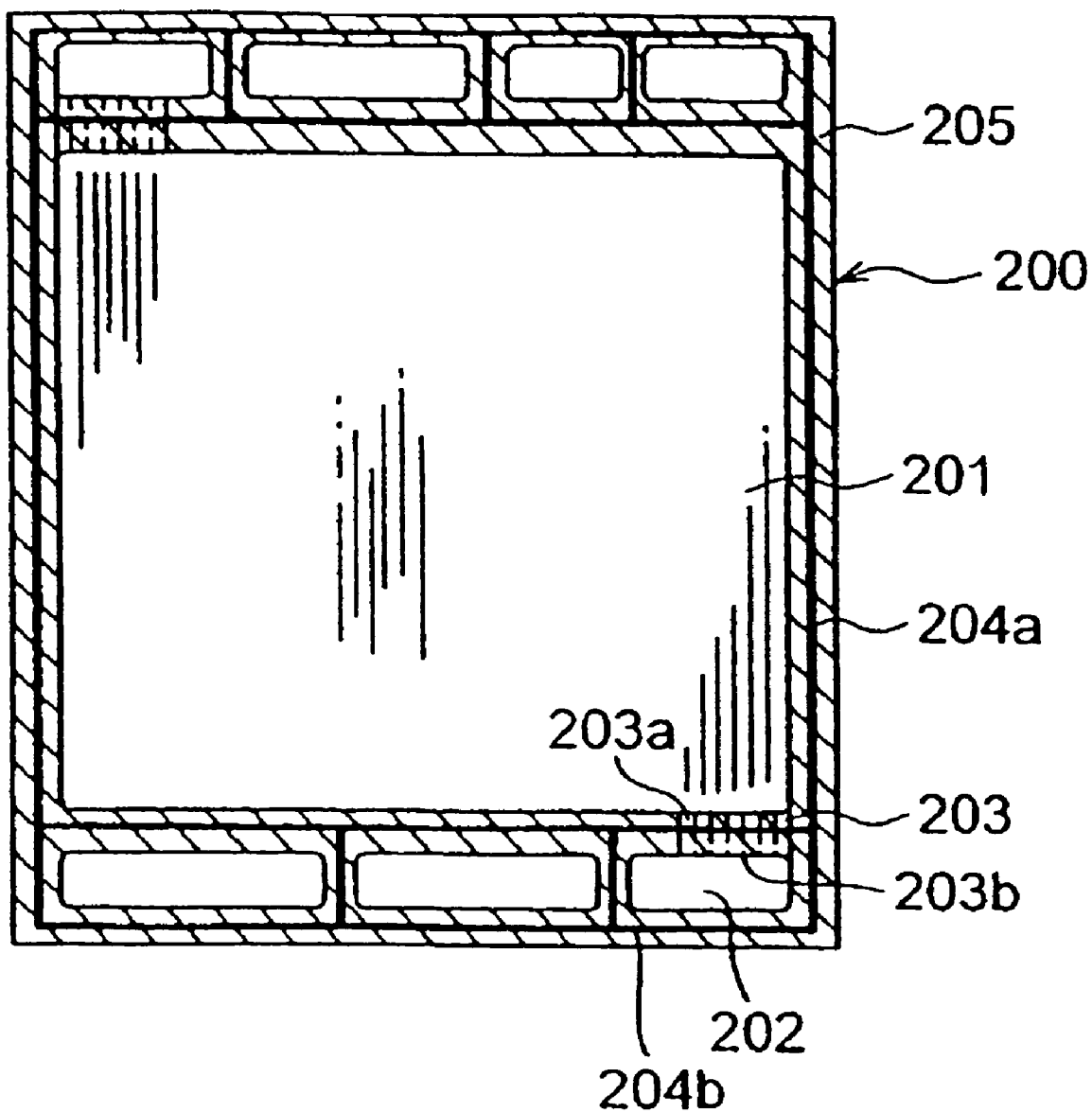
FIG. 12 is a plan view of a conventional separator 200.

20 Fuel cell separator
21 Gas channel
22 Manifold
23 Communication channel
23a Groove
23b Plate member
23e Notch
23f Guide protrusion
23g Through hole
23h Concave portion
23i Through hole
23j Concave portion
24a, 24b, 24c Gasket
24d Convex portion
25 Separator main body

The invention claimed is:

1. A fuel cell separator that has a power generating device interposed between the fuel cell separator and another fuel cell separator, the power generating device having an electrolyte film and electrode films, the fuel cell separator comprising:
a separator main body that includes a gas channel, a manifold that penetrates the separator main body in a fuel cell stacking direction, and a groove that connects the gas channel to the manifold;
a plate member that covers an opening of the groove; and
a gasket that is made of an elastic material, prevents gas leakage from the manifold to the outside, and is formed in a region on the surfaces of the separator main body and the plate member, the region surrounding the manifold,
wherein the plate member has notches or through holes, when the gasket is being integrally molded with the region on the surface of the plate member containing the notches or the through holes, part of the elastic material fills the notches or the through holes, thereby increasing the fixing strength of the plate member to a predetermined position on the opening of the groove, and
wherein the separator main body has guide protrusions protruding from a housing concave portion for housing the plate member at the locations corresponding to the notches or the through holes formed in the plate member, top ends of the guide protrusions are inserted to the notches or the through holes; and
wherein the gasket is integrally molded with the region on the surface of the plate member containing the notches or the through holes, part of the elastic material also fills between the guide protrusions and the notches or the through holes, thereby increasing the fixing strength of the plate member to the predetermined position on the opening of the groove.

2. The fuel cell separator of claim 1, wherein the plate member contains the through hole in the middle of the plate member.

* * * * *